(12) United States Patent
Pekala et al.

(10) Patent No.: US 9,896,555 B2
(45) Date of Patent: Feb. 20, 2018

(54) FREESTANDING, HEAT RESISTANT MICROPOROUS FILM FOR USE IN ENERGY STORAGE DEVICES

(75) Inventors: Richard W. Pekala, Corvallis, OR (US); Srinivas Cherukupalli, Saidabad (IN); Robert R. Waterhouse, Scio, OR (US)

(73) Assignee: Amtek Research International LLC, Lebanon, OR (US)

( * ) Notice: Subject to any disclaimer, the term of this patent is extended or adjusted under 35 U.S.C. 154(b) by 1195 days.

(21) Appl. No.: 13/255,868

(22) PCT Filed: Mar. 19, 2010

(86) PCT No.: PCT/US2010/028055
§ 371 (c)(1),
(2), (4) Date: Nov. 17, 2011

(87) PCT Pub. No.: WO2010/108148
PCT Pub. Date: Sep. 23, 2010

(65) Prior Publication Data
US 2012/0145468 A1    Jun. 14, 2012

Related U.S. Application Data

(60) Provisional application No. 61/161,541, filed on Mar. 19, 2009.

(51) Int. Cl.
*H01M 10/052*    (2010.01)
*C08J 5/18*    (2006.01)
(Continued)

(52) U.S. Cl.
CPC ............... *C08J 5/18* (2013.01); *H01M 2/145* (2013.01); *H01M 2/166* (2013.01);
(Continued)

(58) Field of Classification Search
CPC .... H01M 2/145; H01M 2/166; H01M 2/1686; H01M 10/52; H01M 2220/20
See application file for complete search history.

(56) References Cited

U.S. PATENT DOCUMENTS 5,565,281 A    10/1996    Yu et al.
5,948,557 A *    9/1999    Ondeck et al. ............... 429/508
(Continued)

*Primary Examiner* — Barbara Gilliam
*Assistant Examiner* — Angela Martin
(74) *Attorney, Agent, or Firm* — Stoel Rives LLP

(57) ABSTRACT

Preferred embodiments of a freestanding, heat resistant microporous polymer film (10) constructed for use in an energy storage device (70, 100) implements one or more of the following approaches to exhibit excellent high temperature mechanical and dimensional stability: incorporation into a porous polyolefin film of sufficiently high loading levels of inorganic or ceramic filler material (16) to maintain porosity (18) and achieve low thermal shrinkage; use of crosslinkable polyethylene to contribute to crosslinking the polymer matrix (14) in a highly inorganic material-filled polyolefin film; and heat treating or annealing of biaxially oriented, highly inorganic material-filled polyolefin film above the melting point temperature of the polymer matrix to reduce residual stress while maintaining high porosity. The freestanding, heat resistant microporous polymer film embodiments exhibit extremely low resistance, as evidenced by MacMullin numbers of less than 4.5.

18 Claims, 16 Drawing Sheets

(51) Int. Cl.
*H01M 2/14* (2006.01)
*H01M 2/16* (2006.01)
*H01M 10/52* (2006.01)

(52) U.S. Cl.
CPC ......... *H01M 2/1686* (2013.01); *H01M 10/52* (2013.01); *C08J 2323/06* (2013.01); *H01M 2220/20* (2013.01)

(56) References Cited

U.S. PATENT DOCUMENTS

| | | | |
|---|---|---|---|
| 6,096,213 | A | 8/2000 | Radovanovic et al. |
| 6,524,742 | B1 | 2/2003 | Emanuel et al. |
| 6,602,593 | B1 * | 8/2003 | Callahan et al. .......... 428/316.6 |
| 2004/0010909 | A1 | 1/2004 | Emanuel et al. |
| 2004/0058142 | A1 | 3/2004 | Pekala |
| 2006/0055075 | A1 | 3/2006 | Hoshida et al. |
| 2006/0121269 | A1 | 6/2006 | Miller et al. |
| 2007/0292750 | A1 | 12/2007 | Beard |
| 2008/0257624 | A1 * | 10/2008 | Kubo ........................... 180/68.1 |
| 2009/0068514 | A1 | 3/2009 | Aso et al. |
| 2010/0068612 | A1 | 3/2010 | Nishikawa et al. |

\* cited by examiner

FREESTANDING, HEAT RESISTANT MICROPOROUS FILM FOR USE IN ENERGY STORAGE DEVICES

RELATED APPLICATION

This application is a 371 of International Application No. PCT/US2010/028055, filed Mar. 19, 2010, which claims benefit of U.S. Provisional Patent Application No. 61/161,541, filed Mar. 19, 2009.

This invention was made with Government support under U.S. Department of Energy Cooperative Agreement No. DE-FC26-05NT42403 awarded by DOE. The Government has certain rights in this invention.

COPYRIGHT NOTICE

© 2010 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to the formation of a freestanding, inorganic material-filled, polyolefin film that includes a polymer matrix and exhibits low shrinkage and maintains high porosity at temperatures above the melting point of the polymer matrix. The disclosed polymer film can be used to improve the performance and safety of energy storage devices, such as lithium-ion batteries.

BACKGROUND INFORMATION

Separators contribute materially to the performance, safety, and cost of lithium-ion batteries. During normal operation, a principal function of the separator is to prevent electronic conduction (i.e., short circuits or direct contact) between the anode and cathode while permitting ionic conduction via the electrolyte. For small commercial cells under abuse conditions, such as external short circuit or overcharge, the separator is required to shutdown at temperatures well below the temperature at which thermal runaway can occur. Shutdown results from collapse of the pores of the separator as a consequence of melting and viscous flow of polymer material of which the separator is made. Pore collapse slows down or stops ion flow between the electrodes. Nearly all lithium-ion battery separators contain polyethylene as part of a single- or multi-layer construction so that shutdown begins at about 130° C., which is the melting point of polyethylene.

Separators for the lithium-ion energy storage device market are presently manufactured from "dry" or "wet" processes. Celgard LLC and others have described a dry process in which polypropylene (PP) or polyethylene (PE) is extruded into a thin sheet and subjected to rapid drawdown. The sheet is then annealed at 10-25° C. below the polymer melting point such that crystallite size and orientation are controlled. The sheet is thereafter rapidly stretched in the machine direction (MD) to achieve slit-like pores or voids. Trilayer PP/PE/PP separators produced by the dry process are commonly used in lithium-ion rechargeable batteries.

Wet process separators composed of high molecular weight polyethylene are produced by extrusion of a plasticizer/polymer mixture at elevated temperature, followed by phase separation, biaxial stretching, and extraction of a pore-former material (i.e., plasticizer). The resultant separators have elliptical or spherical pores with good mechanical properties in the machine direction (MD) and transverse direction (TD). PE-based separators manufactured in accordance with wet process techniques by Tonen, Asahi, SK, and ENTEK Membranes LLC have found wide use in lithium-ion batteries.

More recently, battery failures occurring in commercial use have demonstrated that shutdown is not a guarantee of safety. The principal reason is that, after battery separator shutdown, residual stress and reduced mechanical properties above the polymer melting point can lead to shrinkage of, tearing of, or pinhole formation in the separator. The exposed electrodes can then touch and create an internal short circuit that leads to more heating, thermal runaway, and explosion.

In the case of large format lithium-ion cells designed for hybrid electric vehicle (HEV) or plug-in hybrid electric vehicle (PHEV) applications, the benefits of separator shutdown have been openly questioned because it is difficult to guarantee a sufficient rate and uniformity of shutdown throughout the complete cell. As such, battery designers are expected to handle at the system level failure modes that might involve separator shutdown. For example, external short circuits can be prevented by mechanical design and location within the vehicle. Overcharge, overdischarge, and high rate discharge are controlled by a Battery Management System (BMS). Thermal protection can also be handled on a system level, with one or both of built-in active and passive cooling systems. Another consideration is that these batteries are assembled as high voltage stacks, in which the shutdown of a single cell can itself create problems if, for instance, the shut down cell is driven into voltage reversal by the other cells in an electrical series string.

Many companies are, therefore, focused on modifying the construction of a lithium-ion battery to include (1) a heat-resistant separator or (2) a heat-resistant layer coated on either the electrodes or a conventional polyolefin separator. Heat-resistant separators composed of high temperature polymers (e.g., polyphenylene sulfide) have been produced on a limited basis from solution casting, electrospinning, or other process technologies. In these cases, the high polymer melting point prevents separator shutdown at temperatures below 200° C.

U.S. Pat. No. 7,638,230 B2 describes coating onto the negative electrode a porous heat resistant layer composed of an inorganic filler and a polymer binder. Inorganic fillers included magnesia, titania, zirconia, alumina, or silica. Polymer binders included polyvinylidene fluoride and a modified rubber mixture containing acrylonitrile units. The heat resistant layer comprised 1-5 parts binder for every 100 parts inorganic filler by weight. Higher binder contents negatively impacted the high rate discharge characteristics of the battery. Moreover, the thickness of the porous heat-resistant layer had to be limited to 1-10 µm to achieve high discharge rates.

U.S. Patent Application Pub. Nos. US 2008/0292968 A1 and US 2009/0111025 A1 describe an organic/inorganic composite separator, in which a porous substrate is coated with a mixture of inorganic particles and one of a variety of polymer binders to form an active layer on at least one surface of the porous substrate. The porous substrate can be a nonwoven fabric, membrane, or polyolefin-based separator. Inorganic particles are selected from a group consisting of those that exhibit one or more of the following: dielectric constant greater than 5, piezoelectricity, and lithium ion conductivity. The composite separator purportedly exhibits excellent thermal safety, dimensional stability, electrochemical safety and lithium ion conductivity, and a high degree of swelling with electrolyte, compared to uncoated polyolefin-based separators used in lithium-ion batteries.

Evonik (Dresden, Germany) has produced heat-resistant separators by coating a porous ceramic layer of inorganic binder sol on each side of a polyester nonwoven membrane. While having excellent thermal stability, the membranes had extremely low mechanical integrity (e.g., tensile strain <10%), which created problems during battery assembly. The inorganic particles were also found to easily shed from the separator surface.

In each of the above approaches, an inorganic material-filled layer is applied in a secondary coating operation onto an electrode or porous substrate to provide heat resistance and prevent internal short circuits in the battery under high temperature, abuse conditions. The inorganic filled layer is applied as a coating because the described compositions do not provide sufficient mechanical integrity to form a freestanding porous sheet or film. "Freestanding" refers to a film having sufficient mechanical properties that permit manipulation such as winding and unwinding in film form for use in an energy storage device assembly.

The above limitations have motivated this invention of a freestanding, microporous, ultrahigh molecular weight polyethylene (UHMWPE)-based film that contains sufficient inorganic filler particles to provide low shrinkage while maintaining high porosity at temperatures above the melting point of the polymer matrix (>135° C.). Such freestanding, heat resistant films can be used alone or in combination with conventional polyolefin separators to prevent internal short circuits in energy storage devices such as lithium-ion batteries.

SUMMARY OF THE DISCLOSURE

Preferred embodiments of a freestanding, heat resistant microporous polymer film are constructed for use in an energy storage device. The polymer film is thin, has first and second opposite surfaces, and comprises a polymer matrix that binds an inorganic filler material. The polymer matrix includes an ultrahigh molecular weight polyolefin of a molecular weight that provides sufficient molecular chain entanglement to form a microporous film having three-dimensional interconnecting and interpenetrating pore and polymer networks. The bound inorganic filler material is generally uniformly dispersed through the pore and polymer networks from the first surface to the second surface of the polymer film. The microporous film exhibits freestanding characteristics and has pores encompassing a volume fraction of greater than about 60%. The inorganic filler material is present at sufficiently high loading levels to maintain porosity and achieve low thermal shrinkage of the microporous film at temperatures exceeding the melting point temperature of the polymer matrix.

The production of preferred embodiments of the freestanding, heat resistant microporous polymer film implemented one or more of the following approaches to exhibit excellent high temperature mechanical and dimensional stability: (1) incorporation into a porous polyolefin film of sufficiently high loading levels of inorganic or ceramic filler material to maintain porosity and achieve low thermal shrinkage; (2) use of crosslinkable polyethylene to contribute to crosslinking the polymer matrix in a highly inorganic material-filled polyolefin film; and (3) heat treating or annealing of biaxially oriented, highly inorganic material-filled polyolefin film above the melting point temperature of the polymer matrix to reduce residual stress while maintaining high porosity. (Heat treating and annealing are used as interchangeable terms throughout this document.)

The disclosed freestanding, heat resistant microporous film relies at least in part upon ultrahigh molecular weight polyethylene (UHMWPE). The repeat unit of polyethylene is $(-CH_2CH_2-)_x$, where x represents the average number of repeat units in an individual polymer chain. In the case of polyethylene used in many film and molded part applications, x is about 10,000, whereas for UHMWPE, x is about 110,000 ($3.1 \times 10^6$ gm/mol). The vast difference in the number of repeat units is responsible for a higher degree of chain entanglement and the distinctive properties associated with UHMWPE.

One such property of UHMWPE is its ability to resist material flow under its own weight when heated above its melting point temperature. This phenomenon is a result of the ultrahigh molecular weight of UHMWPE and the associated long relaxation times, even at elevated temperatures. Therefore, although UHMWPE is commonly available, it is difficult to process into fiber, sheet, or membrane form. The high melt viscosity typically dictates use of a compatible plasticizer and a twin screw extruder for disentanglement of the polymer chains such that the resultant gel can be processed into a useful form. This approach is commonly referred to as "gel processing," and extraction of the plasticizer results in a porous film or sheet. The terms "film" and "sheet" are used interchangeably throughout this patent application to describe products made in accordance with the disclosed embodiments, and the term "web" is used to encompass films and sheets.

Another property of UHMWPE is its ability to bind large quantities of inorganic filler material into porous films. Examples include silica in lead-acid battery separators and calcium carbonate in breathable membranes. In the latter case, the porous films contain insufficient filler material to give high heat resistance above the polymer melting point temperature, and in the former case, the porous films are too thick (greater than about 150 µm) for use in lithium-ion batteries.

Certain preferred embodiments of the freestanding microporous film include a crosslinkable polyethylene to increase the mechanical strength of the polymer matrix and thereby decrease a propensity for shrinkage. Crosslinked polyethylene (XLPE) has significant applications as an insulating material in the cable and wire industry and for pipes in domestic water supply systems. A few attempts have also been made to use XLPE in battery separator applications, typically using reactive polymers or electron beam techniques to crosslink the polymer.

An organosilane-grafted polyethylene can be processed in the same way as normal polyethylene is processed or in combination with the "gel processing" of UHMWPE. Crosslinking of the grafted material is induced by exposure to trace amounts of water at elevated temperatures, which cause hydrolysis and condensation of the alkoxy groups to form siloxane crosslinks. This crosslinking reaction is normally accelerated by incorporation of a catalyst. The crosslinking of polyethylene chains through covalent bonding prevents the polymer matrix from flowing at elevated temperatures and thereby decreases the shrinkage behavior of the microporous film. The process promotes better mechanical properties such as higher puncture resistance.

Heat treating or annealing effectively decreases high temperature shrinkage of a highly inorganic material-filled, microporous film. Polymer annealing typically entails heating the polymer material to a temperature near its melting point and then slowly cooling the polymer material back to ambient conditions. Annealing relaxes the amorphous phase orientation and perfects the crystalline structure, thereby making the polymer more rigid. Moreover, annealing the polymer material above the melting point temperature ensures that the material has endured higher thermal conditions and thus would withstand deformation when re-subjected to elevated temperatures. This method is viable for highly filled, UHMWPE-based films as the inorganic filler material restricts significant polymer flow and therefore retains the film porosity at high annealing temperatures.

In a first preferred embodiment, a freestanding, heat resistant microporous film is manufactured by combining UHMWPE, inorganic filler particles (e.g., fumed alumina), and a plasticizer (e.g., mineral oil). A mixture of UHMWPE and inorganic filler particles is blended with the plasticizer in sufficient quantity, and the mixture blended with plasticizer is extruded to form a homogeneous, cohesive mass. The mass is processed using blown film, cast film, or calendering methods to give an oil-filled film of reasonable thickness (less than about 250 µm). The oil-filled film can be further biaxially oriented to reduce its thickness and affect its mechanical properties. In an extraction operation, the oil is removed with a solvent that is subsequently evaporated to produce a freestanding, heat resistant microporous film.

In a second preferred embodiment, a polymer matrix, containing UHMWPE in an amount and of a molecular weight sufficient to provide the necessary molecular chain entanglement to form a freestanding, heat resistant microporous film, binds an inorganic filler material that is compatible with a given electrolyte. The resultant freestanding, heat resistant microporous film is wound or stacked in a package, and the pores are filled with an electrolyte. The film is used to separate the electrodes in an energy storage device, for example, a battery, a lithium battery, capacitor, supercapacitor, or fuel cell. The term lithium battery includes both rechargeable and nonrechargeable chemistries. An example of a rechargeable battery is a lithium-ion battery, and an example of a nonrechargeable battery is a lithium metal battery. One of the benefits of this polymer matrix is that it can be used to form, and potentially provide intimate contact or bonding between, adjacent layers of an anode and a cathode.

In a third preferred embodiment, a polymer matrix, containing XLPE is used to form a freestanding, heat resistant microporous film. One of the benefits of this polymer matrix is that it is at least partly crosslinked and can more easily resist polymer flow and thereby maintain film porosity at elevated temperature.

In a fourth preferred embodiment, an inorganic filler material is selected based upon its structure and electrochemical compatibility to provide a freestanding, heat resistant microporous film with excellent wettability and a porosity encompassing a volume fraction of at least 60%. Rapid wetting and decreased fill times are beneficial to the manufacture of energy storage devices, while high porosity and a controlled pore size distribution impart low impedance to the microporous film.

In a fifth preferred embodiment, the freestanding microporous polymer film containing inorganic filler material is positioned adjacent a conventional, unfilled polyolefin film (i.e., separator) that exhibits shutdown characteristics. These two films may optionally be bonded or not bonded to each other. This arrangement combines the best features of both films—the high temperature dimensional stability of the inorganic-filled microporous film and the shutdown characteristics of the unfilled polyolefin film—for use in a lithium-ion battery.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
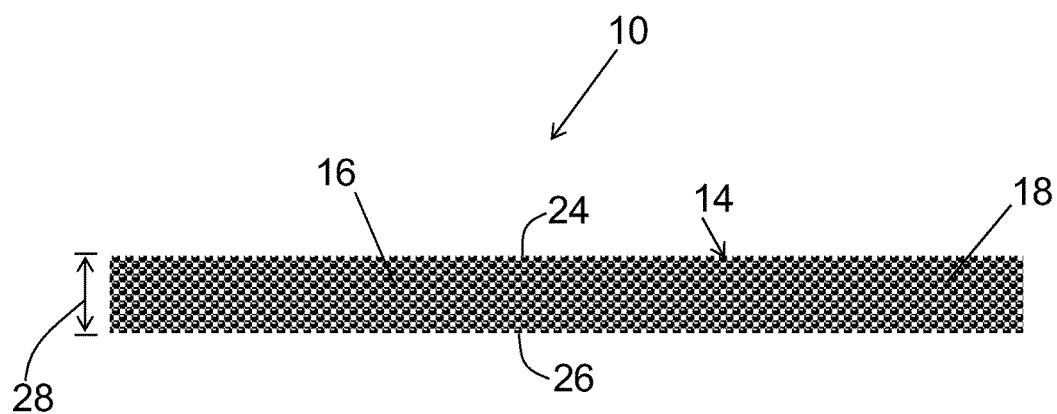
FIG. 1 is a schematic diagram showing in cross section a magnified view of a freestanding, inorganic material-filled microporous film.

A preferred polymeric material used in the production of the microporous film embodiments described is an ultrahigh molecular weight polyolefin. The polyolefin most preferably used is an ultrahigh molecular weight polyethylene (UHMWPE) having an intrinsic viscosity of at least 10 deciliter/gram, and preferably greater than about 14-18 deciliters/gram. It is not believed that there is an upper limit on intrinsic viscosity for the UHMWPEs usable in the disclosed film embodiments. Currently available commercial UHMWPEs have an upper limit of intrinsic viscosity of about 29 deciliters/gram.

The plasticizer is a nonevaporative solvent for the polymer and is preferably in a liquid state at room temperature. The plasticizer has little or no solvating effect on the polymer at room temperature, and the plasticizer performs its solvating action at temperatures at or above the softening temperature of the polymer. For UHMWPE, the solvating temperature would be above about 160° C., and preferably in a range of between about 160° C. and about 220° C. A preferred plasticizer is a processing oil, such as a paraffinic oil, naphthenic oil, aromatic oil, or a mixture of two or more such oils. Examples of suitable processing oils include oils sold by Shell Oil Company, such as Gravex™ 942; oils sold by Calumet Lubricants, such as Hydrocal™ 800; and oils sold by Nynas Inc., such as HR Tufflo® 750.

Any solvent for extracting the processing oil from the films may be used, as long as the solvent is not deleterious to the inorganic filler material contained in the polymer matrix and has a boiling point temperature that makes it practical to separate the solvent from the plasticizer by distillation. Such solvents include 1,1,2 trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, diethyl ether, hexane, heptane, and toluene. In some cases, it is desirable to select the processing oil such that any residual oil in the polymer sheet after extraction is electrochemically inactive.

Inorganic filler materials are commonly used as reinforcing agents in polymer systems (e.g., silicone rubber) but not at the loading levels that approach a three-dimensional inorganic material network structure. In the manufacture of freestanding, heat resistant microporous films, the thermally induced phase separation of the polymer matrix and processing oil ensure that the extracted film has three-dimensional interconnecting and interpenetrating pore and polymer networks. Such a structure ensures ion flow or transport from one surface of the film to the opposite surface. In a similar fashion, the interconnected polymer network ensures transmission of a load throughout the bulk structure. As inorganic filler material is added to the mixture of polymer material and processing oil, they remain as isolated aggregates in the extracted separator until a critical concentration is reached. In the case of monodisperse spheres, a percolation threshold volume fraction of 18% filler material would ensure an interconnected inorganic network from one film surface to the opposite one. An inorganic filler material network can be formed at lower volume fractions, provided that the filler material has a higher dimensionality than that of a solid sphere.

In addition to controlling the volume fraction of inorganic filler material by formulation, in-line or off-line processing steps can be used to tailor the final film structure and properties. For example, extractor-dryer process conditions and thermal annealing can be used to increase the volume fraction of filler material in the freestanding microporous film.

FIG. 1 is a schematic diagram showing in cross section a freestanding, inorganic material-filled microporous polymer film 10 based upon the above-described model. Polymer film 10 includes polymer fibrils 12 (FIG. 2) forming a polymer matrix 14 that binds inorganic filler particles 16 in a microporous web having pores 18. Polymer fibrils 12 are preferably those of ultrahigh molecular weight polyolefin material including ultrahigh molecular weight polyethylene (UHMWPE), either alone or blended with high density polyethylene (HDPE). Polymer film 10 has a first major surface 24 and a second, opposite major surface 26 between which inorganic filler particles 16 are generally uniformly dispersed. The distance between major surfaces 24 and 26 represents a film thickness 28, which is preferably between about 5 µm and 100 µm.

Figure 2:
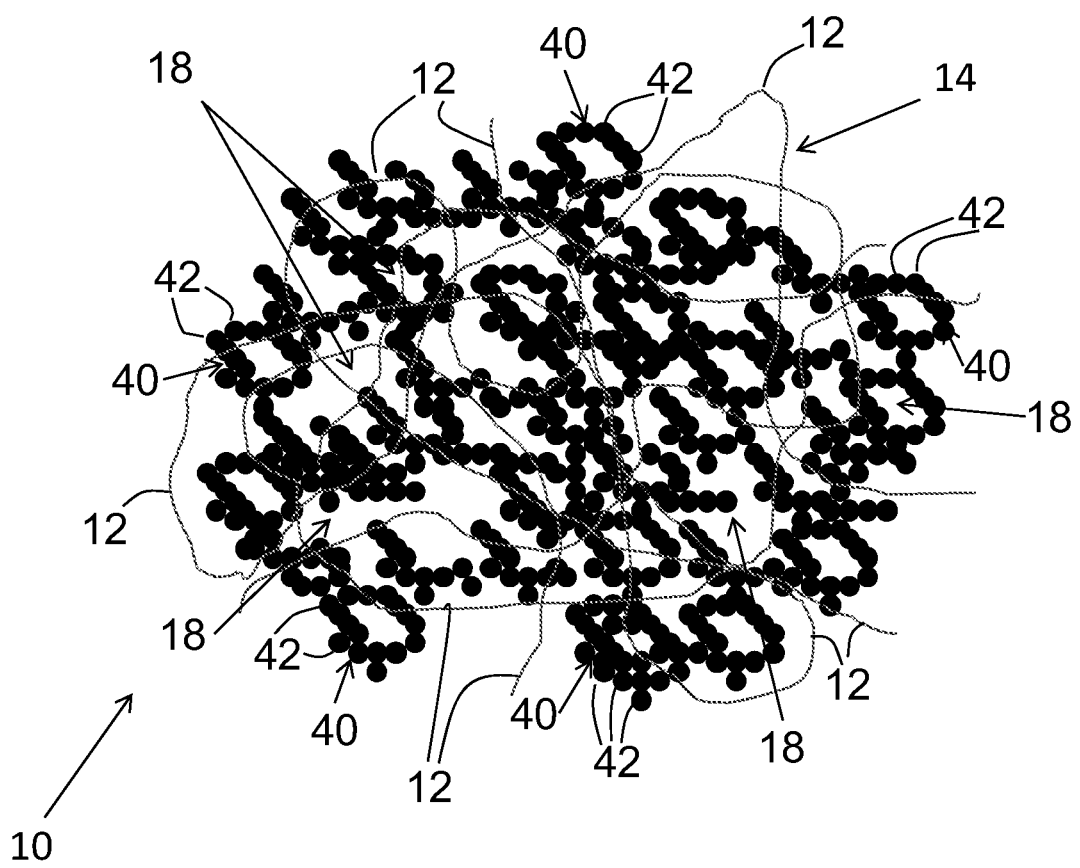
FIG. 2 is a schematic diagram showing with increased magnification a bulk portion of the microporous film of FIG. 1.

FIG. 2 is a schematic diagram of a bulk portion of polymer film 10, showing the interrelationship of polymer matrix 14, inorganic filler particles 16 (FIG. 1), and pores 18. The ultrahigh molecular weight polyolefin provides sufficient molecular chain entanglement so that polymer film 10 has three-dimensional interconnecting and interpenetrating pore and polymer networks, which are established by pores 18 and polymer fibrils 12, respectively. Inorganic filler particles 16 are organized in aggregate structures 40 of primary particles 42 that are trapped within matrix 14 to form an interconnecting and interpenetrating three-dimensional inorganic filler network. There is generally uniform distribution of inorganic aggregates 40 and pores 18 throughout the bulk structure of polymer film 10. The three-dimensional interconnecting and interpenetrating pore network ensures ion flow or transport from one to the other of surfaces 24 and 26 in an energy storage device application, and the interconnecting polymer network ensures transmission of an applied load throughout the bulk structure of polymer film 10.

As a result of the three-dimensional inorganic network, microporous polymer film 10 exhibits low shrinkage at temperatures above the polymer melting point temperature, thereby providing the heat resistance necessary to prevent internal short circuits in an energy storage device under abuse conditions.

Inorganic filler particles 16 of any kind can potentially be used in freestanding, heat resistant microporous film 10, provided that filler particles 16 are compatible with the electrolyte of an energy storage device of which microporous film 10 is a component part. In some cases, inorganic filler particles 16 may have a surface treatment (e.g., dimethyl silazane-treated precipitated silica) to aid in compatibility with the electrolyte or impart other properties (e.g., hydrophobicity). In other cases, the inorganic filler material may contain primary particles 42 that have a core-shell structure to ensure compatibility (e.g., alumina-coated silica). Finally, microporous film 10 may have to be adequately dried to prevent reactions with the electrolyte or its components.

Figure 3A:
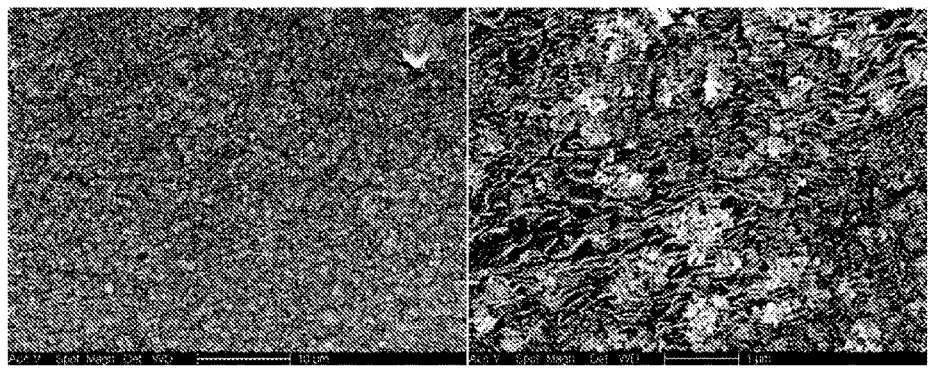
FIG. 3A shows, with different amounts of magnification, two side-by-side views of surface scanning electron micrographs (SEMs) of a fumed alumina-filled microporous film of a type diagrammed in FIG. 1.
Figure 3B:
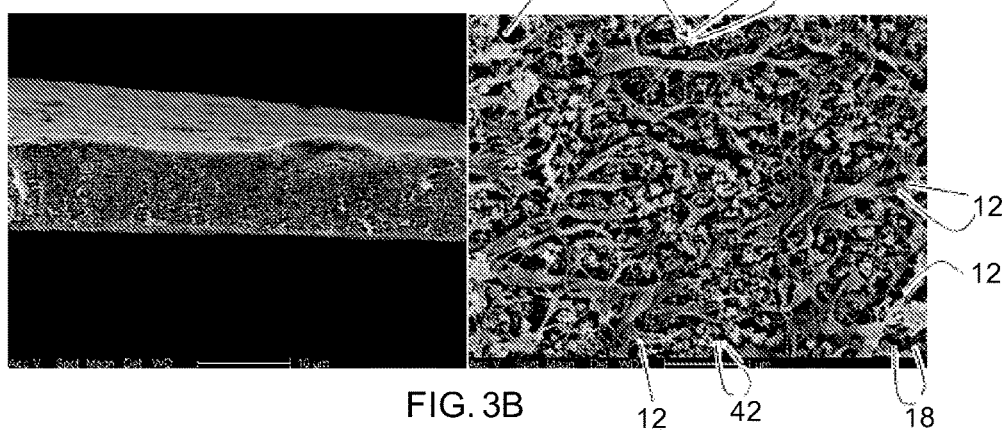
FIG. 3B shows, with different amounts of magnification, two side-by-side views of freeze-fracture cross-section SEMs of a fumed alumina-filled microporous film of a type diagrammed in FIG. 1.
Figure 4A:
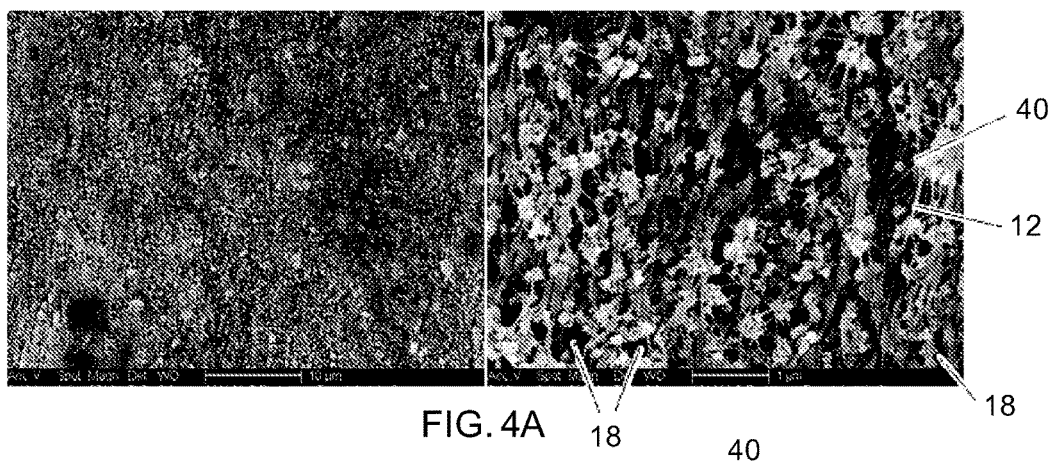
FIG. 4A shows, with different amounts of magnification, two side-by-side views of surface SEMs of a precipitated silica-filled microporous film of a type diagrammed in FIG. 1.
Figure 4B:
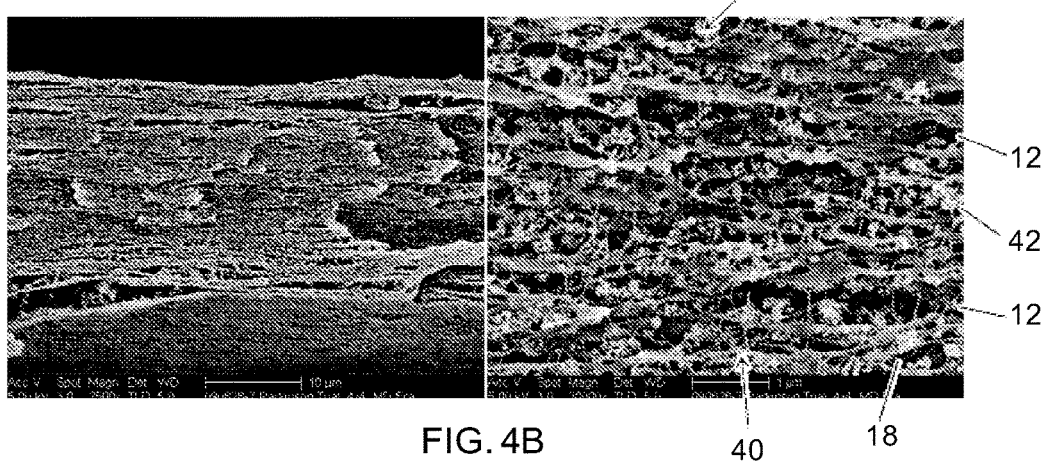
FIG. 4B shows, with different amounts of magnification, two side-by-side views of freeze fracture cross-section SEMs of a precipitated silica-filled microporous film of a type diagrammed in FIG. 1.

FIG. 3A shows surface SEMs and FIG. 3B shows freeze-fracture cross-section SEMs for a freestanding, 67 wt % fumed alumina-filled microporous film; and FIG. 4A shows surface SEMs and FIG. 4B shows freeze-fracture cross-section SEMs for a freestanding, 69 wt % precipitated silica-filled microporous film. Each of FIGS. 3A, 3B, 4A, and 4B presents a left-side image with a 10 µm scale marker and a right-side image with a 1 µm scale marker. With reference to FIGS. 3A and 4A, in each case, a uniform distribution of porosity and inorganic filler material aggregates is observed at the surface, with the silica-filled microporous film of FIG. 4A having more highly oriented and elongated polymer fibrils compared to those of the alumina-filled microporous film of FIG. 3A. The freeze-fracture cross-section SEMs also show a higher degree of polymer orientation in the silica-filled microporous film of FIG. 4B than that in the alumina-filled microporous film of FIG. 3B.

Unlike separators with porous ceramic coatings, the films shown in FIGS. 3A and 3B and in FIGS. 4A and 4B have trapped within the UHMWPE matrix inorganic filler particles that do not shed or dislodge. Although many inorganic filler particles have starting particle sizes of 10 µm-50 µm, the extrusion process is designed to break down the inorganic filler material into aggregates of submicron particle size. Uniform dispersion of the inorganic filler particles and formation of a three-dimensional network materially contribute to achieving microporous films with low thermal shrinkage at about 135° C. to about 200° C.

Figure 5B:
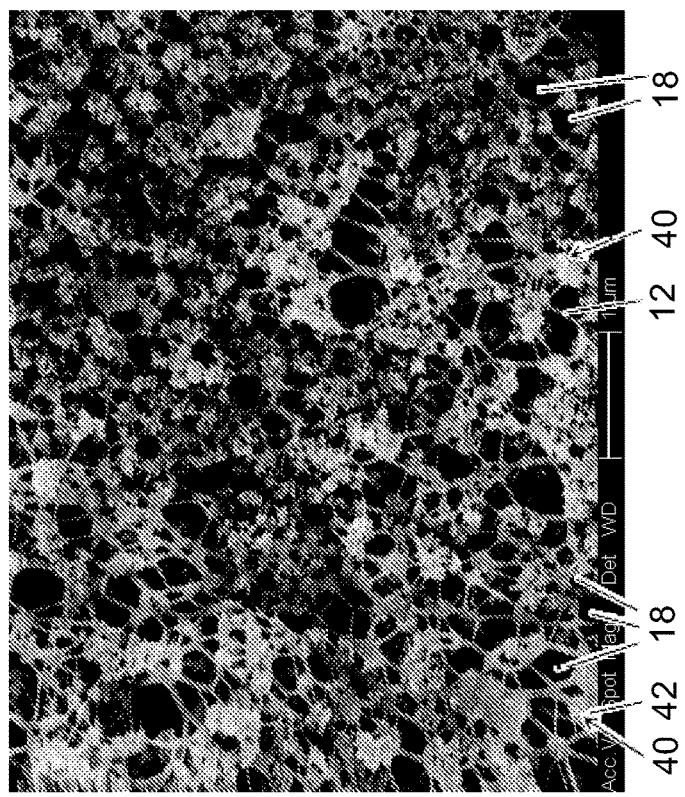
FIGS. 5A and 5B are surface SEMs representing a side-by-side comparison of the morphologies of precipitated silica-filled microporous film, respectively, before and after annealing at 165° C.
Figure 5A:
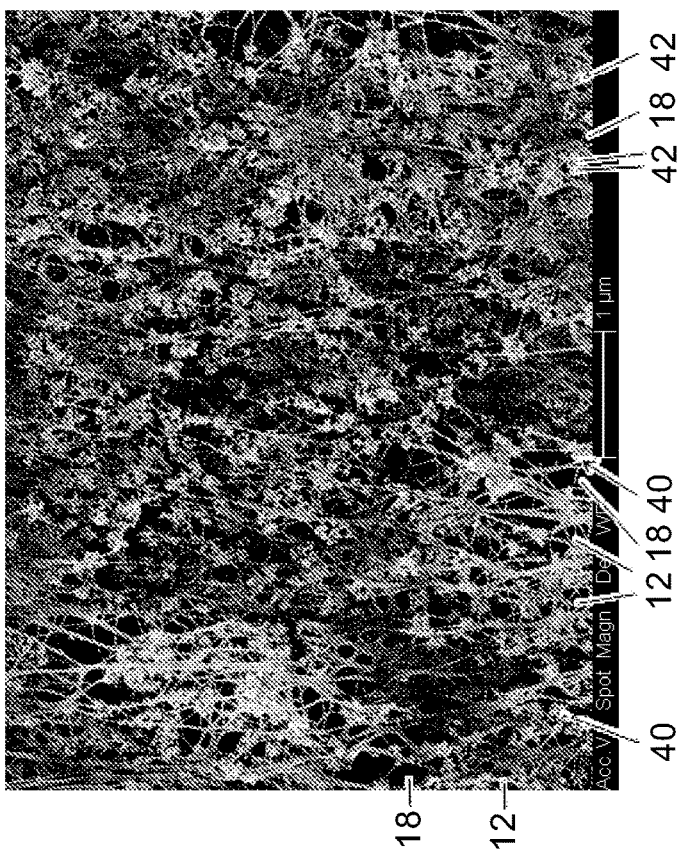

Annealing is commonly performed to reduce residual stress in polymer films through polymer chain rearrangement. Although it can improve the dimensional stability of inorganic material-filled microporous films at elevated temperature, annealing can also impact the morphology of the microporous film. FIGS. 5A and 5B show, with a 1 µm scale marker, surface SEMs of a silica-filled microporous film for comparison of their surface morphologies, respectively, before and after annealing at 165° C. Comparison of FIGS. 5A and 5B reveals that, for the microporous film shown, polymer fibrils coalesce and the surface area of the polymer matrix is reduced after annealing.

The following Examples 1-12 relate to the properties and characteristics of embodiments of the disclosed freestanding, heat resistant microporous film as a composition. Each of the embodiments of the composition combines UHMWPE and an inorganic filler material with sufficient plasticizer at an appropriate temperature to allow formation of a homogeneous, cohesive mass that is biaxially oriented and then extracted to form a freestanding, heat resistant microporous film. The inorganic fillers and polymer matrices used to form these films vary widely.

Examples 1-3 provide baseline information for production and analysis of seven formulations of freestanding, heat resistant precipitated silica-filled microporous films. Example 1 details the production of the seven formulations of process oil-filled sheets; Example 2 describes biaxial stretching of, and thereafter removal of the process oil from, rolls of the polymer sheets; and Example 3 shows the effect of annealing on thickness, air permeability, and puncture strength for one of the formulations set out in Example 1.

EXAMPLE 1

Process oil-filled sheets were produced from seven formulations (identified by letters A-G) listed in Table 1. For each formulation, ingredients were combined in a horizontal mixer by adding all dry ingredients to the mixer and blending them with low speed agitation to form a homogeneous mix. Hot process oil was sprayed onto the blended dry ingredients, and the mixture was then fed to a 96 mm counter-rotating twin screw extruder (ENTEK Manufacturing, Inc.) operating at a melt temperature of about 215° C. Additional process oil was added in-line at the throat of the extruder to give a final process oil content of approximately 65 wt %-68 wt %. The resultant melt was passed through a sheet die into a calender, in which the gap was used to control the extrudate thickness in the range of 150 µm-200 µm.

TABLE 1

| Raw Material | Supplier | Units | A | B | C | D | E | F | G |
|---|---|---|---|---|---|---|---|---|---|
| Silica, 1165 MP milled | Rhodia | kg | 200 | 200 | 200 | 200 | | | |
| Silica, WB-37 | PPG | kg | | | | | 200 | 200 | 200 |
| UHMWPE, GUR 4150 | Ticona | kg | 180.5 | 141.4 | 115.3 | 87 | 96.7 | 87 | 75.2 |
| Colorant 190015 | Ampacet | kg | 5.8 | 5.8 | 5.8 | 5.8 | 5.8 | 5.8 | 5.8 |
| Lubricant, Ca/Zn stearate | Ferro | kg | 1 | 1 | 1 | 1 | 1 | 1 | 1 |
| Antioxidant, FS 1041 | Ciba | kg | 1 | 1 | 1 | 1 | 1 | 1 | 1 |
| Pellets* | ENTEK | kg | 143.6 | 143.6 | 143.6 | 143.6 | 143.6 | 143.6 | 143.6 |
| Oil, Hydrocal 800 | Calumet | liters | 450.4 | 450.4 | 450.4 | 450.4 | 465.6 | 465.6 | 465.6 |
| Nominal SiO$_2$/PE wt ratio | | | 1.2 | 1.5 | 1.8 | 2.3 | 2.1 | 2.3 | 2.6 |

*pellets contain approximately 10.6% UHMWPE, 24.4% silica, and 65% oil

The oil-filled sheets (450 mm-500 mm wide) were wound on cardboard cores, and rolls of the process oil-filled sheets were saved for subsequent biaxial orientation.

EXAMPLE 2

Process oil-filled sheets produced from the seven formulations listed in Table 1 were sequentially stretched in the machine direction (MD) and transverse direction (TD) using Machine Direction Orientation and Tenter Frame equipment available at Parkinson Technologies Inc., Woonsocket, R.I. The process oil-filled sheets were stretched at elevated temperature (115° C.-121° C.) to form a process oil-filled film of about 10 µm-40 µm thickness. Rolls of the thinner, process oil-filled sheet were then extracted in a portable extractor-dryer unit, where trichloroethylene was used to remove the process oil and hot air was used to drive off the solvent to form a freestanding, dimensionally stable microporous film.

The microporous films were tested for thickness, air permeability (Gurley Model No. 4340), and puncture strength.

The Gurley Model No. 4340 Automatic Densometer measures air permeability in terms of seconds at standard pressure. Specifically, the Gurley value is time measured in seconds required for 100 ml of air to pass through a film with an area of 6.45 cm$^2$ at a pressure difference of 304 Pa.

The % porosity of the microporous films is calculated from:

bulk volume of the film: calculated from a sample of fixed area (15.518 cm$^2$) and the measured thickness of the film;

skeletal density of the film: calculated from the silica to polymer ratio of the film and the density of silica (2.2 gm/cm$^3$) and the observed density of UHMWPE (0.93 gm/cm$^3$);

skeletal volume of the sample of fixed area: calculated from the skeletal density of the sample and the measured mass of the sample; and % porosity of the film=100×(bulk volume−skeletal volume)/bulk volume.

For thermal shrinkage evaluation, the films were cut into 100 mm×100 mm samples, which were then placed in an oven for 1 hour at 200° C. The oven was back-filled with argon gas to prevent oxidation of the polymer matrix. The MD and TD shrinkage after 200° C. exposure was then calculated for each sample after it had cooled to room temperature.

Table 2 shows the corresponding data for microporous films produced at different stretch ratios.

TABLE 2

| Formulation | Stretch ratio MD | Stretch ratio TD | Thickness (µm) | Gurley (secs) | Puncture strength (g) | Shrinkage after 1 hr @ 200° C. MD % | Shrinkage after 1 hr @ 200° C. TD % | % Porosity |
|---|---|---|---|---|---|---|---|---|
| A | 2.5 | 4.5 | 24 | 107 | 307 | 23.4 | 21.9 | 79.3 |
|   | 4   | 4.5 | 12 | 83  | 244 | 30.4 | 23.3 | 80.1 |
| B | 2.5 | 4.5 | 25 | 101 | 251 | 19.6 | 25.1 | 79.4 |
|   | 3.35 | 3.35 | 24 | 110 | 289 | 24.0 | 16.8 | 79.0 |
| C | 3.5 | 4   | 35 | 153 | 287 | 14.9 | 7.8  | 82.8 |
|   | 2.5 | 4.5 | 31 | 99  | 273 | 10.6 | 16.2 | 79.4 |
| D | 4   | 4   | 25 | 94  | 196 | 17.2 | 8.2  | 82.0 |
|   | 3   | 4   | 36 | 101 | 208 | 13.4 | 12.8 | 82.0 |
|   | 2   | 4   | 46 | 119 | 225 | 7.6  | 7.2  | 79.9 |
| E | 3   | 3.3 | 26 | 96  | 223 | 9.4  | 6.9  | 78.6 |
|   | 2.5 | 4   | 24 | 114 | 200 | 7.6  | 6.8  | 78.6 |
|   | 4   | 3.3 | 19 | 70  | 197 | 14.9 | 10.5 | 80.9 |
| F | 3   | 3   | 35 | 153 | 214 | 8.0  | 2.4  | 78.3 |
|   | 2   | 4   | 37 | 226 | 228 | 6.3  | 3.3  | 76.9 |
|   | 4   | 4   | 20 | 110 | 159 | 10.8 | 2.7  | 78.2 |
| G | 2   | 4.5 | 29 | 113 | 198 | 4.9  | 6.1  | 78.1 |
|   | 2.5 | 4.5 | 20 | 58  | 155 | 9.5  | 8.6  | 82.4 |

EXAMPLE 3

The films of formulations D and E were first annealed (i.e., heat treated) at elevated temperature and then subsequently tested for MD and TD shrinkage at 200° C. This approach is used to relax residual stress from the biaxial orientation and process oil and solvent extraction processes to further improve dimensional stability, as shown in Table 3. Annealing can be done through either an on-line or an off-line process.

TABLE 3

| Formulation | Stretch ratio MD | Stretch ratio TD | Thickness (µm) | Gurley (secs) | Puncture strength (g) | Shrinkage after 1 hr @ 200° C. MD % | Shrinkage after 1 hr @ 200° C. TD % |
|---|---|---|---|---|---|---|---|
| D | | | | | | | |
| As Produced | 3 | 4 | 36 | 101 | 208 | 13.4 | 8.3 |
| Annealed at 165° C. | 3 | 4 | 34 | 164 | 194 | 6.9 | 3.0 |
| E | | | | | | | |
| As Produced | 2.5 | 4 | 24 | 114 | 200 | 7.6 | 6.8 |
| Annealed at 185° C. | 2.5 | 4 | 23 | 41 | 153 | 3.1 | 1.3 |

Examples 4 and 5 below represent heat treated, fumed aluminum oxide-filled microporous films that include polymer matrices containing, respectively, UHMWPE alone and UHMWPE blended with XLPE.

EXAMPLE 4

A mixture was prepared with the following ingredients: 500 g of fumed aluminum oxide (AEROXIDE® Alu C, available from Evonik), 267.5 g of ultrahigh molecular weight polyethylene (GUR® 4120, available from Ticona), 4 g of lithium stearate (MATHE®, available from Norac®), and 750 g of naphthenic process oil (Hydrocal® 800, available from Calumet Lubricants Co.). The formulation had a filler-to-polymer weight ratio of 1.86. The materials were first blended in a bucket and then loaded into a high intensity mixer (W10, available from Littleford Day, Inc., Florence, Ky.) and uniformly mixed. The mixed powder was fed to a 27 mm, co-rotating twin screw extruder (Entek Manufacturing Inc.) while additional process oil was introduced through an inlet port into extruder zone #1 (at 2.04 kg/h). A blown film set-up with a 50 mm die, and 1.9 mm gap was used to extrude a thin film. A stable bubble was achieved at a blow up ratio of 4.2 and take up speed of 1.98 m/min to obtain a process oil-filled sheet with a 330 mm layflat. The film was extracted in accordance with the procedure outlined in Example 2 to obtain a 67 µm-thick microporous film. The Gurley value of the film was 250 secs, and the MD and TD shrinkage after 1 hour exposure at 200° C. was 9.5% and 8.6%, respectively.

EXAMPLE 5

A mixture was prepared with the following ingredients: 500 g of fumed aluminum oxide (AEROXIDE® Alu C, available from Evonik), 180.8 g of ultrahigh molecular weight polyethylene (GUR® X-167, available from Ticona), 60 g of crosslinkable polyethylene (Isoplas® P 471, available from Micropol), 3.7 g of lithium strearate (MATHE®, available from Norac®), 1.5 g antioxidant (Irganox® B215, available from Ciba), and 700 g of naphthenic process oil (Hydrocal® 800, available from Calumet Lubricants Co.). The formulation had a filler-to-polymer weight ratio of 2.03. The materials were first blended in a bucket and then loaded into a high intensity mixer (W10, available from Littleford Day, Inc., Florence, Ky.) and uniformly mixed. The powder mix and process oil were fed to a twin screw extruder in a manner similar to that described in Example 4. A stable bubble was achieved at a blow up ratio of 4.36 and take up speed of 2.28 m/min to obtain a process oil-filled sheet with a 343 mm layflat. The film was extracted in accordance with the procedure outlined in Example 2 to obtain a 38 µm-thick microporous film. The Gurley value of the film was 243 secs, and the MD and TD shrinkage after 1 hour exposure at 200° C. was 2.5% and 2.0%, respectively.

Examples 6 and 7 below represent heat treated microporous films that include precipitated silica filler material and hydrophobic precipitated silica filler material, respectively, and polymer matrices containing a blend of UHMWPE and HDPE.

EXAMPLE 6

A dry mixture was prepared with following ingredients: 600 g of precipitated silica (Hi-Sil® SBG, available from PPG Industries), 304 g of ultrahigh molecular weight polyethylene (CUR® 4150, available from Ticona), 33 g of high density polyethylene (CUR® 8020, available from Ticona), and 1 g of lubricant (Petrac®, available from Ferro). The materials were hand-mixed and slowly added to 5050 g of naphthenic process oil (Hydrocal® 800, available from Calumet Lubricants Co.), maintained at 94° C., to prepare a slurry. The formulation had a filler-to-polymer weight ratio of 1.78. The slurry was directly fed at 3.6 kg/h to a 27 mm, co-rotating twin screw extruder (ENTEK Manufacturing Inc.). A blown film set-up with a 50 mm die and 1.9 mm gap was used to extrude a thin film. A stable bubble was achieved at a blow up ratio of 3.15 and a take up speed of 2.7 m/min to obtain a process oil-filled sheet with a 248 mm layflat. The film was extracted in accordance with the procedure outlined in Example 2 to give a 45 µm-thick microporous film. The Gurley value of the film was 27 secs, and the MD and TD shrinkage after 1 hour exposure at 200° C. was 21.6% and 13.4%, respectively.

EXAMPLE 7

A dry mixture was prepared with following ingredients: 1200 g of hydrophobic precipitated silica (Sipernat® D 10, available from Evonik), which is precipitated silica that is surface treated to impart to it hydrophobic properties, 608 g of ultrahigh molecular weight polyethylene (CUR® 4120, available from Ticona), 66 g of high density polyethylene (CUR® 8020, available from Ticona), and 2 g of lubricant (Petrac®, available from Ferro). The materials were hand-mixed and slowly added to 10,100 g of naphthenic process oil (Hydrocal® 800, available from Calumet Lubricants Co.) maintained at 94° C., to prepare a slurry. The formulation had a filler-to-polymer weight ratio of 1.78. The material was processed in a manner similar to that described in Example 6. A stable bubble was achieved at a blow up ratio of 3.6 and a take up speed of 4.6 m/min to obtain a process oil filled sheet with a 285 mm layflat. The film was extracted in accordance with the procedure outline in Example 2 to give a 24 µm-thick microporous film. The Gurley value of the film was 75 secs, and the MD and TD shrinkage after 1 hour exposure at 200° C. was 30.5% and 25.3%, respectively.

Examples 8 and 9 below represent, respectively, 31 µm-thick and 14 µm-thick, fumed aluminum oxide-filled microporous films that include polymer matrices containing a blend of UHMWPE and HDPE. The fumed aluminum oxide filler materials of Examples 8 and 9 were manufactured by different companies.

EXAMPLE 8

A mixture was prepared with the following ingredients: 500 g of fumed aluminum oxide (AEROXIDE® Alu C, available from Evonik), 182.5 g of ultrahigh molecular weight polyethylene (CUR® X-167, available from Ticona), 60.8 g of high density polymer (GUR® 8020, available from Ticona), 3.6 g of lithium stearate (MATHE®, available from Norac®), and 700 g of naphthenic process oil (Hydrocal® 800, available from Calumet Lubricants Co.). The formulation had a filler-to-polymer weight ratio of 2.03. The materials were first blended in a bucket and then loaded into a high intensity mixer (W10, available from Littleford Day, Inc., Florence, Ky.) and uniformly mixed. The powder mix and process oil were fed to a twin screw extruder in a manner similar to that described in Example 4. A stable bubble was achieved at a blow up ratio of 4.5 and a take up speed of 2.1 m/min to obtain a process oil-filled sheet with a 350 mm layflat. The film was extracted in accordance with the procedure outlined in Example 2 to give a 31 µm-thick microporous film. The Gurley value of the film was 263 secs, and the MD and TD shrinkage after 1 hour exposure at 200° C. was 3.6% and 2.9%, respectively.

EXAMPLE 9

A mixture was prepared with the following ingredients: 500 g of fumed aluminum oxide (SpectrAl® 100, available from Cabot), 182.5 g of ultrahigh molecular weight polyethylene (GUR® X-167, available from Ticona), 60.8 g of high density polyethylene (GUR® 8020, available from Ticona), 3.7 g of lithium strearate (MATHE®, available from Norac®) and 600 g of naphthenic base oil (Hydrocal® 800, available from Calumet Lubricants Co.). The formulation had a filler-to-polymer weight ratio of 2.03. The materials were first blended in a bucket and then loaded into a high intensity mixer (W10, available from Littleford Day, Inc., Florence, Ky.) and uniformly mixed. The powder mix and process oil were fed to a twin screw extruder in a manner similar to that described in Example 4. A stable bubble was achieved at a blow up ratio of 4.5 and a take up speed of 3.0 m/min to obtain a process oil-filled sheet with a 350 mm layflat. The film was extracted in accordance with the procedure outlined in Example 2 to obtain a 14 µm-thick microporous film. The Gurley value of the film was 137 secs, and the MD and TD shrinkage after 1 hour exposure at 200° C. was 2.8% and 3.3%, respectively.

Example 10 below presents a comparison of the 200° C. shrinkage test for an original and a fumed alumina-coated battery separator. Fumed alumina is an inorganic material. The comparison reveals that the uncoated battery separator did not survive the test, but the fumed alumina-coated battery separator exhibited little shrinkage and became optically transparent as a result of shutdown.

EXAMPLE 10 (COMPARATIVE)

A commercial battery separator, Teklon Gold LP (ENTEK Membranes LLC, Oregon), was coated on both sides with fumed alumina using polyvinyl alcohol as a binder. A coating solution was prepared with the following ingredients: 1153 g of alumina suspension in water (CAB-O-SPERSE® PG 008, available from Cabot), 21 g of polyvinyl alcohol (MW=124,000–186,000 g/mol, available from Aldrich), 192 g of isopropyl alcohol, and 664 g of deionized water. A dip coating process was used on the Teklon Gold LP separator, where it was passed through the coating solution at 3.3 m/min followed by a drying tunnel heated to 120° C. As it exited the drying tunnel, the dry, coated separator was wound onto a 75 mm ID cardboard core. After coating, the average separator thickness increased from about 12.1 μm to about 14.4 μm, and the Gurley value increased from 234 secs to 348 secs. The MD and TD shrinkage for the coated separator after 1 hour exposure at 200° C. was 2.7% and 3.3%, respectively. An uncoated, Teklon GOLD LP separator shriveled up into a small, clear mass after 1 hour exposure at 200° C.

EXAMPLE 11

Figure 6:
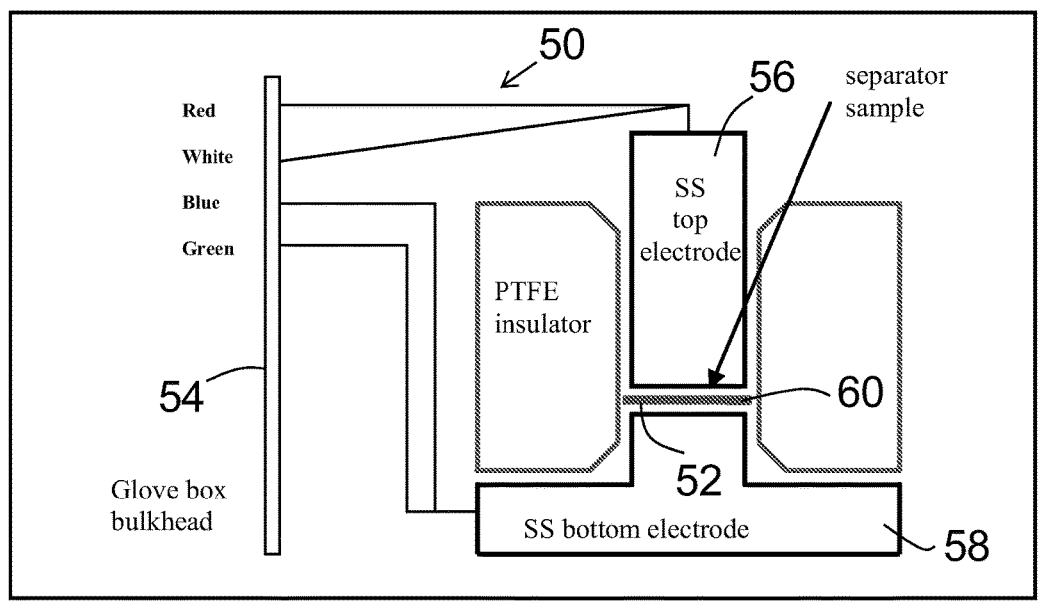
FIG. 6 is a block diagram of a glove box operatively connected to a fixture to perform electrical resistance measurements of sample separators.
Figure 7:
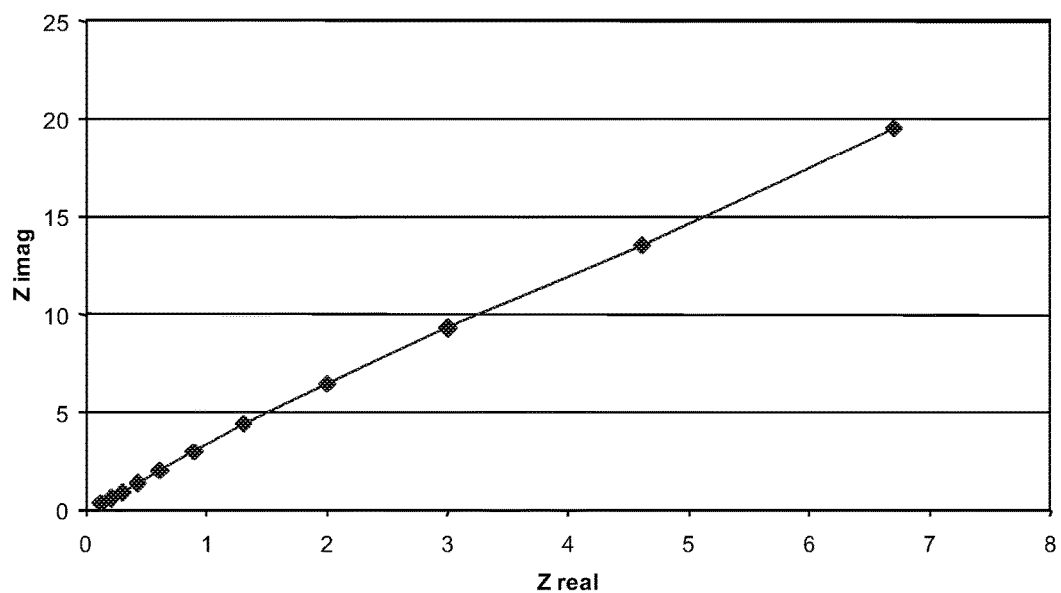
FIG. 7 is an EIS plot of a sample separator of silica-filled, biaxially stretched microporous film used for electrical resistance measurement.
Figure 8:
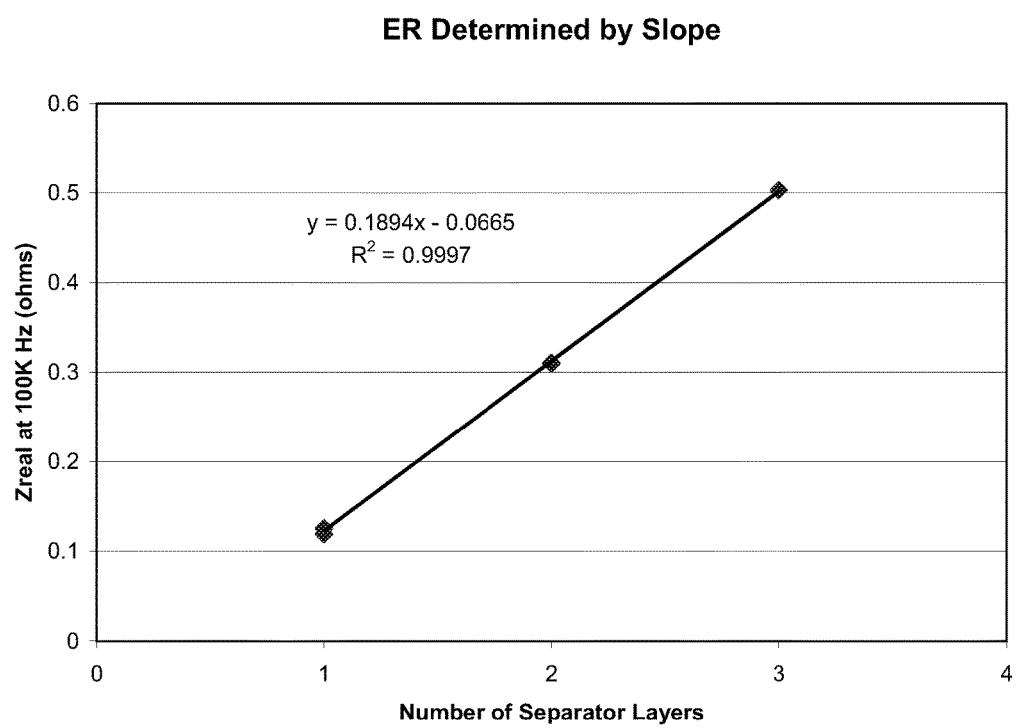
FIG. 8 is a plot of the real component of the measured impedance at 100 KHz for multiple layers of a separator.

Electrical resistance (ER) or impedance is a significant measured property of a microporous film used in energy storage device applications. FIG. 6 is a diagram of a stainless steel fixture 50 used to perform electrical resistance measurements on a sample separator 52 positioned inside a Manostat Model 41-905-00 glove box (only a bulkhead 54 of the glove box is shown in FIG. 6). With reference to FIG. 6, fixture 50 includes stainless steel electrodes 56 and 58, a lithium hexafluorophosphate electrolyte (1M LiPF$_6$ in 1:1 Ethylene Carbonate:Ethyl Methyl Carbonate (EMC)) 60 contained within sample separator 52, and an impedance analyzer (Gamry PC4 750) (not shown) operating over a frequency range of 100 KHz to 1 KHz. FIG. 7 is an Electrochemical Impedance Spectroscopy (EIS) plot of sample separator 52 of silica-filled, microporous film of formulation F from 100 KHz to 1 KHz used for electrical resistance measurement. FIG. 8 is a plot of the real component of the measured impedance at 100 KHz is plotted for 1, 2, and 3 layers of separator 52. The slope of the linear fit of measured resistance to the number of separator layers is used as the electrical resistance of sample separator 52.

Electrical resistance measurements made on freestanding, inorganic-filled microporous films exhibit extremely low resistance (impedance), as evidenced by MacMullin numbers of less than 4.5. The MacMullin number, $N_{Mac}$, is a dimensionless ratio that is useful for describing the resistance of a microporous film or separator material without reference to a particular electrolyte or operating condition (e.g., temperature at which measurement is made). The MacMullin number is defined in U.S. Pat. No. 4,464,238 of Caldwell et al. as the ratio of the electrical resistance of an electrolyte-saturated porous medium, r, to the resistance of an equivalent volume (and shape) of electrolyte, $r_0$, i.e., $$N_{Mac}=r/r_0.$$

Calculating $N_{Mac}$ from experimental data, Caldwell et al. refers to FIG. 1 of their patent illustrating an apparatus similar in concept to the Model 9100-2 test system, available from Palico Instrument Laboratories, Circle Pines, Minn., and employ the following calculation:

$$N_{Mac}=(r_2-r_1)/r_0+1,$$

where:
 $r_1$=resistance measured without the separator,
 $r_2$=resistance measured with the separator in place,
 $r_0$=resistance of the volume of electrolyte with the same dimensions as the separator, and
 $r_0=\rho*t/A$, where $\rho$=resistivity of the electrolyte,
  t=thickness of the separator, and
  A=area through which ion conduction occurs.

A source of confusion is the appended "+1" in the calculation of $N_{Mac}$. The argument for the "+1" comes from the measurement of the resistance, r, of the separator, using the device in FIG. 1 of Caldwell et al. In particular, the measurement, $r_1$, in the absence of the separator, includes the resistance of the volume of electrolyte occupied by the separator in $r_2$. Thus, to obtain the true value of the separator resistance, r, the resistance of the occupied volume must be subtracted from $r_2$.

$$r=r_2-(r_1-\rho*t/A)$$

Dividing this expression by $r_0$ again, and rearranging gives the result: $N_{Mac}=(r_2-r_1)/r_0+1$.

The measurements of the resistance of the embodiments of the disclosed microporous films were performed using a somewhat different apparatus and approach (FIG. 6). In this case, measurement of the microporous film resistance, r, is performed directly, without need for subtraction of any bath resistance. Therefore, the calculation is much simpler, and there is no "+1" appended:

$$N_{Mac}=r/r_0=r/(\rho*t/A).$$

Table 4 summarizes the thickness, areal resistance, resistivity, and MacMullin numbers for four selected formulations of Example 2, the microporous films produced in Examples 8 and 9, and an unfilled commercially available Teklon™ HPIP separator.

TABLE 4

| Description | Thickness (μm) | Areal Resistance (ohm-cm$^2$) | Resistivity (ohm-cm) | MacMullin Number |
|---|---|---|---|---|
| Teklon HPIP (UHMWPE-based separator, no filler) | 25 | 2.15 | 869 | 7.2 |
| Example 2, Formulation E, MD:TD Stretch Ratio 3 × 3 | 40 | 0.84 | 209 | 1.7 |
| Example 2, Formulation E, MD:TD Stretch Ratio 2 × 4 | 37 | 0.89 | 238 | 2.0 |
| Example 2, Formulation E, MD:TD Stretch Ratio 4 × 4 | 23 | 0.54 | 231 | 1.9 |
| Example 2, Formulation E, MD:TD Stretch Ratio 4 × 4, Annealed at 165° C. | 23 | 0.44 | 189 | 1.6 |
| Example 8, 67% AluC | 36 | 1.07 | 300 | 2.5 |
| Example 9, 67% SpectrAl 100 | 18 | 0.68 | 386 | 3.2 |

The electrical resistances of inorganic material-filled microporous films presented in Table 4 are significantly lower than the electrical resistance of Teklon HPIP, which has the lowest MacMullin number of any unfilled, lithium-ion battery separator manufactured by ENTEK Membranes LLC. The microporous films presented in Table 4 have low resistance values measured at room temperature (25° C.), and such low resistance values would be expected to be maintained at lower operating temperatures.

Table 5 shows the electrical resistance (impedance) of a battery separator coated with an inorganic, alumina layer as described in Example 10. Comparison of Tables 4 and 5 shows that freestanding, inorganic material-filled microporous films have significantly lower resistance (impedance) as compared to conventional, uncoated polyolefin battery separators and polyolefin battery separators coated with inorganic or ceramic filler materials.

TABLE 5

| | Thickness (μm) | Areal Resistance (ohm-cm²) | Resistivity (ohm-cm) | MacMullin Number |
|---|---|---|---|---|
| Teklon Gold LP | 12.1 | 1.85 | 1460 | 13.2 |
| Teklon Gold LP, alumina coated | 14.4 | 2.40 | 1668 | 14.9 |

Figure 9:
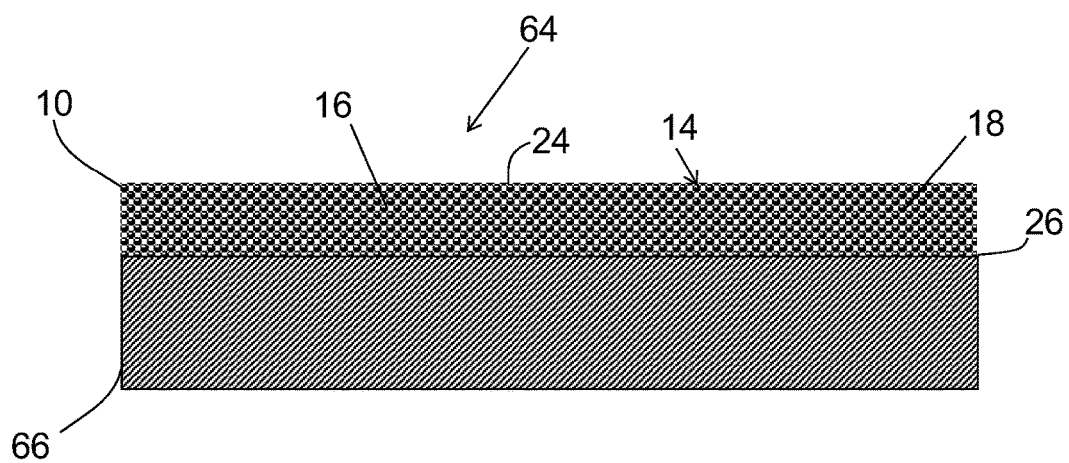
FIG. 9 shows a multilayer separator assembly of a conventional, unfilled polyolefin film and the freestanding, inorganic material-filled microporous film of FIG. 1.

FIG. 9 shows and Example 12 below presents an example of a multilayer separator assembly 64 of a conventional, unfilled microporous polyolefin film 66 positioned surface-to-surface with freestanding microporous polymer film 10 containing inorganic filler particles 16. Separator assembly 64 combines the high temperature dimensional stability of freestanding microporous polymer film 10 and the thermal shutdown characteristics of unfilled microporous polyolefin film 66.

EXAMPLE 12

A silica-filled, oil-containing sheet was manufactured in accordance with formulation E in Table 1. The sheet was subsequently biaxially stretched (2.5 MD×4.5 TD), extracted, and dried using the procedure outlined in Example 2. The resultant freestanding, silica-filled microporous film had a thickness of about 21 μm and a Gurley value of 89 secs. A 12 μm thick Teklon GOLD LP separator (which is a microporous polymer film available from ENTEK Membranes LLC) was placed on top of, but not bonded to, the silica-filled microporous film. A disk was punched from the combined layers to form a separator assembly, and the pores were wetted with electrolyte (1M Lithium trifluoromethanesulfonimide in 1:1 propylene carbonate:triethylene glycol dimethyl ether). This electrolyte exhibits constant impedance and low vapor pressure up to 200° C. The wetted separator assembly was sandwiched between two nonporous carbon disks and then placed between two metal platens. Next, 3.1 MPa pressure was applied and the 1 KHz impedance was monitored as the platens were heated at 50° C./min from 25° C. to 180° C. to determine the shutdown temperature. The impedance was nearly constant from 25° C. to 100° C. At about 135° C., the impedance of the separator assembly started to increase. The shutdown temperature, which is defined as the temperature at which the 1 KHz impedance is 1000 times higher than the 1 KHz impedance at 100° C., was determined to be 152° C. When the individual films were run in the same test, the Teklon GOLD LP exhibited a shutdown temperature of about 152° C., whereas the silica-filled film exhibited almost no change in impedance from 25° C. to 180° C. and no shutdown temperature was detected.

Figure 10:
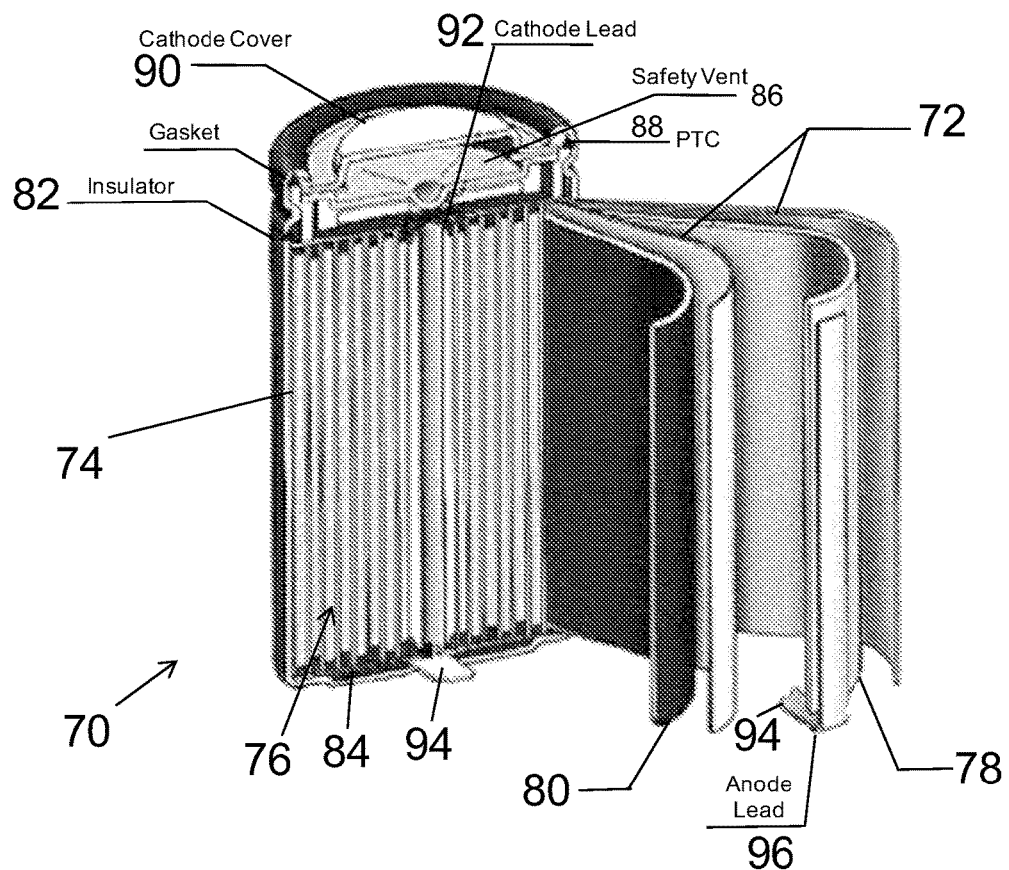
FIG. 10 is a partly exploded view of the interior of one-half section of a cylindrical nonaqueous secondary battery of which the microporous film of FIG. 1 is a component.
Figure 11:
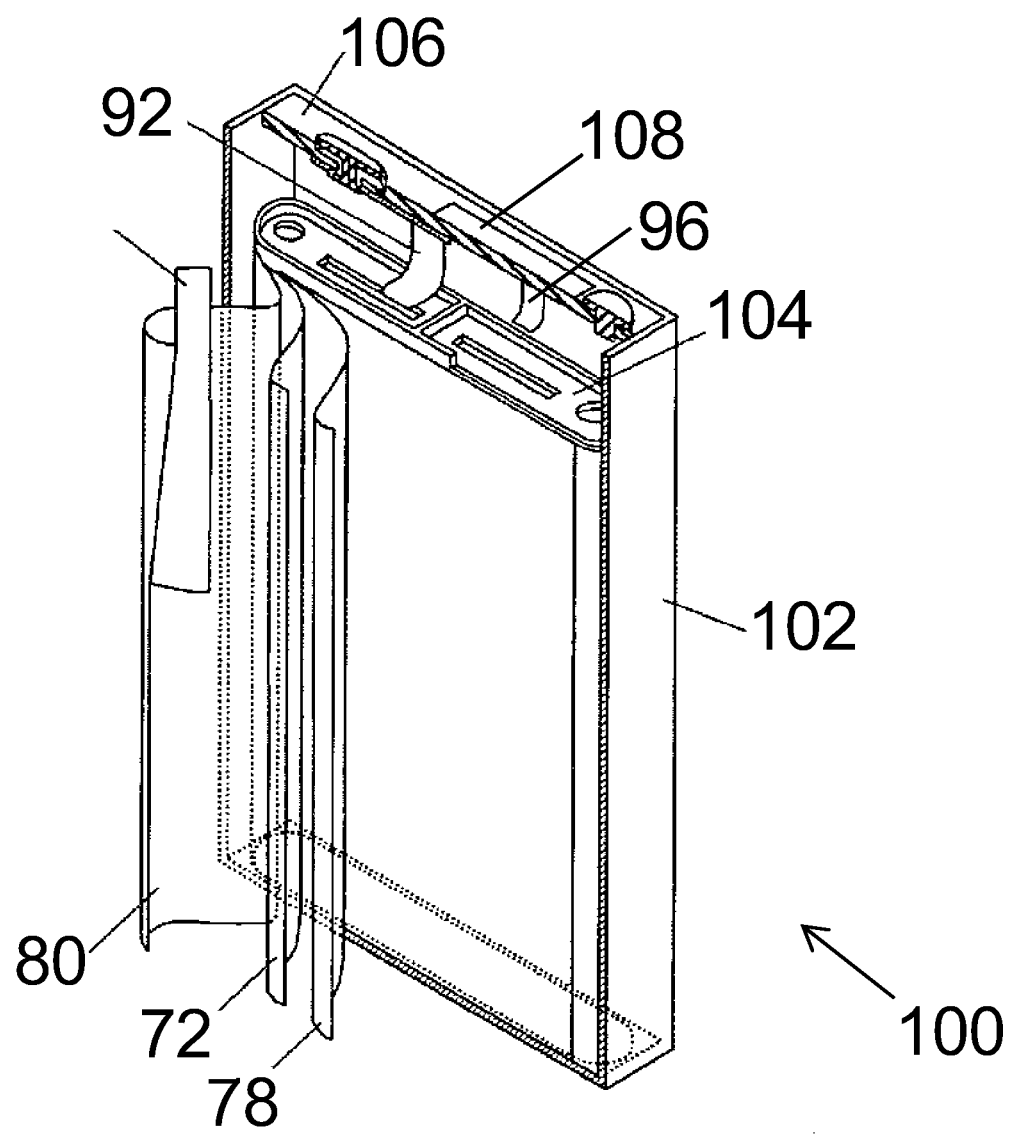
FIG. 11 is a partly exploded view of the interior of a section of a prismatic nonaqueous secondary battery of which the microporous film of FIG. 1 is a component.

A preferred implementation of freestanding, inorganic material-filled microporous film 10 is its use in a battery. A battery converts chemical energy to electrical energy. A wide variety of electrochemically active materials can be used to form the anode and cathode in batteries, as referenced in David Linden (Editor in Chief), *Handbook of Batteries*, 2nd ed., McGraw-Hill, Inc. (1995). Example electrochemically active materials are carbon for the anode and lithium cobalt oxide for the cathode. FIGS. 10 and 11 show two examples of nonaqueous lithium-ion secondary (i.e., rechargeable) batteries of which the disclosed freestanding inorganic material-filled microporous film is a component.

FIG. 10 is a partly exploded view of the interior of one-half section of a cylindrical nonaqueous secondary battery 70, of which a freestanding, heat resistant inorganic material-filled microporous film 72 is a component. Battery 70 has a pressurized cylindrical metal enclosure 74 for a battery assembly 76 in the form of a long spiral of pressed-together components comprising microporous film 72 positioned between a negative electrode (cathode) sheet 78 and a positive electrode (anode) sheet 80. Battery assembly 76 is set between a top insulator 82 and a bottom insulator 84 and is submerged in electrolyte. A pressure-sensitive vent 86 releases extra pressure from metal enclosure 74 in the event battery 70 overheats to the point of possible explosion from over-pressure. A Positive Temperature Coefficient (PTC) switch 88 keeps battery 70 from overheating. A cathode enclosure cover 90 is connected to a cathode lead 92, and an anode terminal 94 is connected to an anode lead 96.

FIG. 11 is a partly exploded view of the interior of a section of a thin profile nonaqueous secondary battery 100, in which microporous film 72 is a component. Battery 100 includes a thin enclosure 102 of generally rectangular cross-section for a prismatic battery assembly 104 that includes microporous film 72 positioned between negative electrode 78 and positive electrode 80 and is submerged in electrolyte, as described above for battery assembly 76. A cathode enclosure cover 106 is connected to cathode lead 92, and an anode terminal 108 is connected to anode lead 96.

Figure 12:
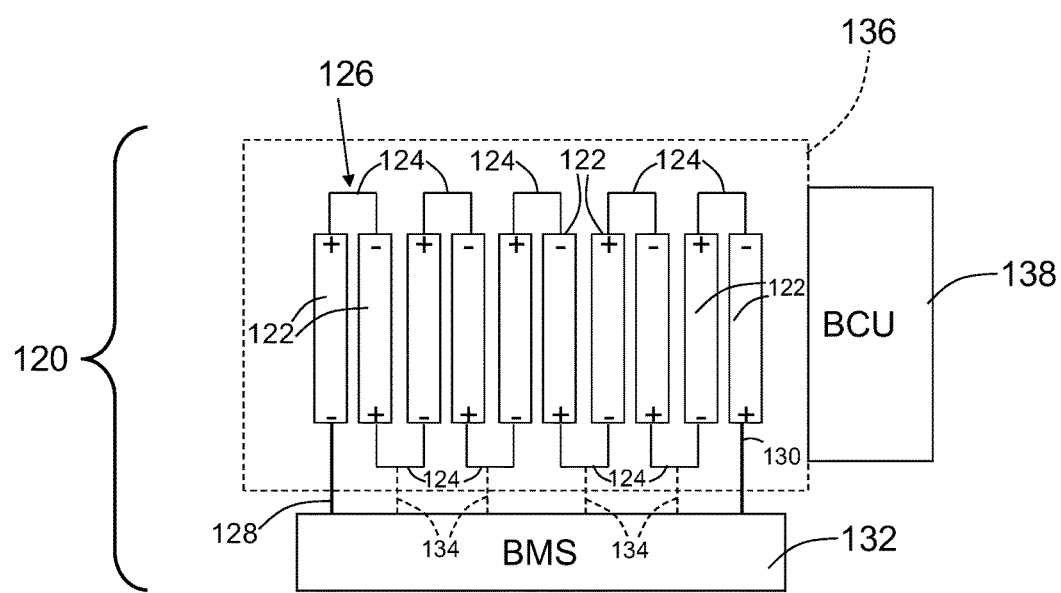
FIG. 12 is a block diagram of a battery pack comprised of series-connected nonaqueous secondary cells constructed in a manner generally similar to that of the batteries of FIGS. 10 and 11.

FIG. 12 is a block diagram of a battery pack 120 comprised of series-connected nonaqueous secondary cells 122 (ten shown) constructed in a manner generally similar to that of battery 70 of FIG. 10 and of battery 100 of FIG. 11. Cells 122 are preferably large format lithium-ion cells designed for use in electric motor vehicles. The high temperature mechanical and dimensional stability of microporous film 72 keeps electrodes 78 and 80 physically separated on macroscopic and microscopic scales to ensure safety of large-format lithium ion cells used in HEV and PHEV applications. Cells 122 of battery pack 120 are electrically connected by interconnect leads 124 and are arranged in a stack 126 in which the two terminal cells 122 provide a power cathode lead 128 and a power anode lead 130.

A Battery Management System (BMS) 132 is connected to cell stack 126 by power leads 128 and 130 and by voltage and temperature sensing connections 134 to interconnect leads 124. BMS 132 is of a type used with large format lithium-ion cells designed for HEV or PHEV applications, as discussed in the background information section above.

Cell stack 122 is housed in an enclosure 136 of suitable material and configuration to provide physical protection to cells 122 and fluid (air or liquid) cooling for cells 122 under control of a Battery Cooling Unit (BCU) 138.

FIGS. 13A, 13B, 13C, and 13D are block diagrams of different configurations of motor power trains implemented at least in part with battery pack 120 of FIG. 12 to deliver motive force to turn wheels 148 of a motor vehicle.

Figure 13A:
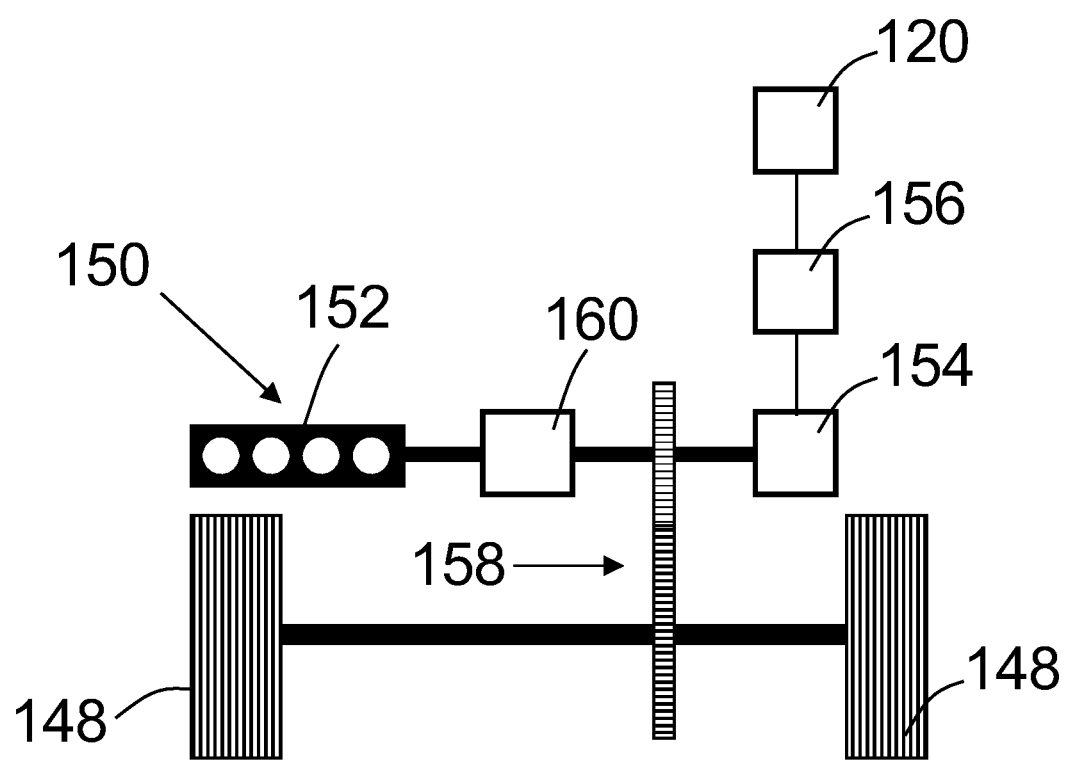
FIGS. 13A, 13B, 13C, and 13D are block diagrams of different configurations of motor power trains implemented at least in part with a battery pack of FIG. 12 to deliver motive forced to turn wheels of a motor vehicle.

FIG. 13A is a block diagram of a hybrid electric vehicle motor power train 150 including an internal combustion engine 152 and an electric motor/generator 154 configured for operation in parallel. With reference to FIG. 13A, battery pack 120 provides direct current power to an inverter 156, which provides alternating current power to electric motor/generator 154, which then turns wheels 148 by means of speed reduction gears 158. Alternatively, internal combustion engine 152 is connected to speed reduction gears 158 through a transmission 160. The power delivered from internal combustion engine 152 can also be used to recharge battery pack 120 through motor/generator 154 and inverter 156.

Figure 13B:
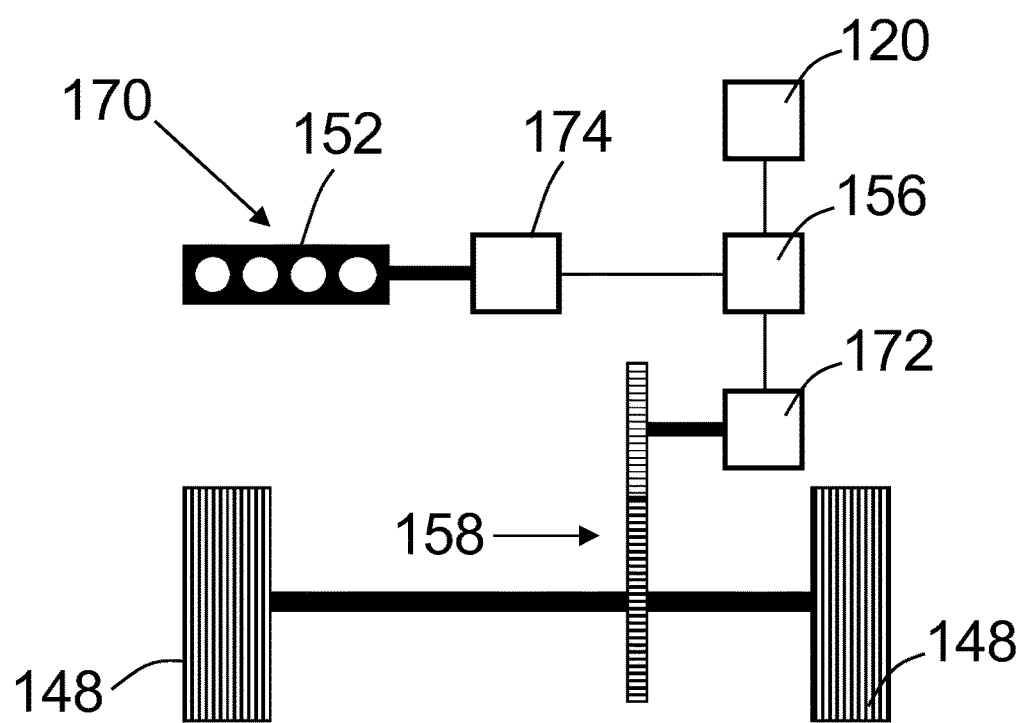

FIG. 13B is a block diagram of a hybrid electric vehicle power train 170 including internal combustion engine 152 and an electric motor 172 configured for operation in series.

With reference to FIG. 13B, battery pack 120 provides direct current power to inverter 156, which provides alternating current power to electric motor 172, which then turns wheels 148 by means of speed reduction gears 158. Alternatively, internal combustion engine 152 is connected to a generator 174. The power from engine-driven generator 174 can be used to drive electric motor 172 or to recharge battery pack 120 through inverter 156.

Figure 13C:
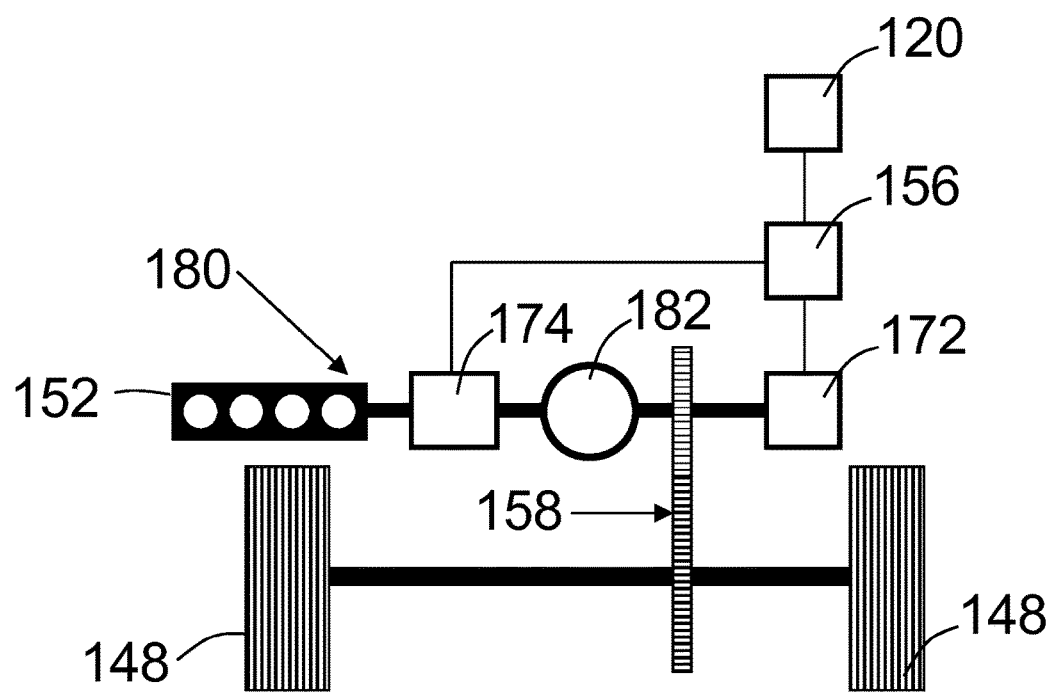

FIG. 13C is a block diagram of a hybrid electric vehicle power train 180 including internal combustion engine 152 and electric motor 172 configured for series-parallel operation. With reference to FIG. 13C, battery pack 120 provides direct current power to inverter 156, which provides alternating current power to electric motor 172, which then turns wheels 148 by means of speed reduction gears 158. Alternatively, internal combustion engine 152 is connected to generator 174 and a power split device 182, which divides the power delivered from internal combustion engine 152 between speed reduction gears 158, which drive wheels 148, and generator 174. The power from engine-driven generator 174 can be used to recharge battery pack 120 through inverter 156.

Figure 13D:
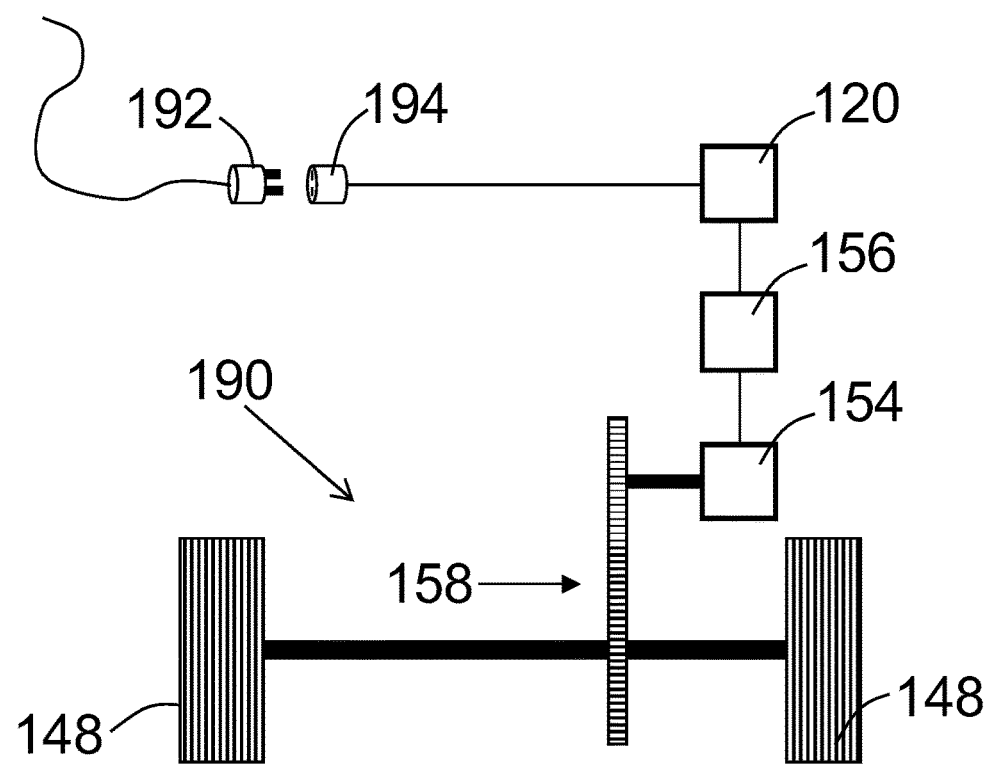

FIG. 13D is a block diagram of an electric motor vehicle power train 190 including electric motor/generator 154. With reference to FIG. 13D, battery pack 120 provides direct current power to inverter 156, which provides alternating current power to motor/generator 154, which then turns wheels 148 by means of speed reduction gears 158. Battery pack 120 is recharged from an external power source 192 through a plug-in connector 194 on the vehicle.

It will be obvious to those having skill in the art that many changes may be made to the details of the above-described embodiments without departing from the underlying principles of the invention. The scope of the present invention should, therefore, be determined only by the following claims.

The invention claimed is:

1. A freestanding, heat resistant microporous polymer film for use in an energy storage device, the microporous polymer film having first and opposite second surfaces, comprising:
   a polymer matrix binding inorganic filler material, the polymer matrix characterized by a melting point temperature and formed of polymer fibrils;
   the polymer matrix including an ultrahigh molecular weight polyethylene that provides sufficient molecular chain entanglement to form three-dimensional interconnecting and interpenetrating pore and polymer networks through which the bound inorganic filler material is generally uniformly dispersed from the first surface to the second surface; characterized by
   the microporous polymer film being a microporous polymer film annealed at a temperature above the melting point temperature of the polymer matrix;
   the interconnecting and interpenetrating pore network having pores encompassing a volume fraction of greater than 60%; and
   the inorganic filler material present at a loading level of greater than about 53 wt. % in the annealed microporous polymer film to achieve by coalescence of the polymer fibrils a lower thermal shrinkage than that achievable before the annealing of the polymer matrix and retention of porosity of the freestanding microporous polymer film at temperatures exceeding the melting point temperature of the polymer matrix.

2. The microporous polymer film of claim 1, in which the ultrahigh molecular weight polyethylene is combined with one or more of crosslinkable polyethylene, high density polyethylene, or other polyethylene of lower molecular weight than that of ultrahigh molecular weight polyethylene.

3. The microporous polymer film of claim 1, in which the polymer matrix is sequentially stretched biaxially to achieve biaxial orientation of the microporous polymer film.

4. The microporous polymer film of claim 1, in which the inorganic filler material includes alumina or silica, or a combination of alumina and silica.

5. The microporous polymer film of claim 1, in which the inorganic filler material includes surface treated silica or surface treated alumina, or a combination of surface treated silica and surface treated alumina.

6. The microporous polymer film of claim 1, in which the three-dimensional interconnecting and interpenetrating pore network contributes to an electrical resistance represented by a MacMullin number, $N_{Mac}$, of less than 4.5.

7. The microporous polymer film of claim 1, further comprising an unfilled microporous polyolefin film having thermal shutdown characteristics and positioned to form a multilayer separator assembly.

8. In an energy storage device of a type having multiple electrodes and wound or stacked in a package filled with an electrolyte, the improvement comprising:
   a heat resistant microporous polymer film exhibiting freestanding characteristics and having first and opposite second surfaces, the polymer film including a polymer matrix binding inorganic filler material, the polymer matrix characterized by a melting point temperature and formed of polymer fibrils;
   the polymer matrix including an ultrahigh molecular weight polyethylene that provides sufficient molecular chain entanglement to form three-dimensional interconnecting and interpenetrating pore and polymer networks through which the bound inorganic filler material is generally uniformly dispersed from the first surface to the second surface; characterized by
   the microporous polymer film being a microporous polymer film annealed at a temperature above the melting point temperature of the polymer matrix;
   the interconnecting and interpenetrating pore network having pores encompassing a volume fraction of greater than 60%; and
   the inorganic filler material present at a loading level of greater than about 53 wt. % in the annealed microporous polymer film to achieve by coalescence of the polymer fibrils a lower thermal shrinkage than that achievable before the annealing of the polymer matrix and retention of porosity of the microporous polymer film at temperatures exceeding the melting point temperature of the polymer matrix.

9. The energy storage device of claim 8, in which the ultrahigh molecular weight polyethylene is combined with one or more of crosslinkable polyethylene, high density polyethylene, or other polyethylene of lower molecular weight than that of ultrahigh molecular weight polyethylene.

10. The energy storage device of claim 8, in which the polymer matrix is sequentially stretched biaxially to achieve biaxial orientation of the microporous polymer film.

11. The energy storage device of claim 8, in which the inorganic filler material bound by the polymer matrix includes alumina or silica, or a combination of alumina and silica.

12. The energy storage device of claim 8, in which the inorganic tiller material bound by the polymer matrix includes surface treated silica or surface treated alumina, or a combination of surface treated silica and surface treated alumina.

13. The energy storage device of claim 8, in which the three-dimensional interconnecting and interpenetrating pore network formed in the microporous polymer film contributes to an electrical resistance represented by a MacMullin number, $N_{Mac}$, of less than 4.5.

14. The energy storage device of claim 8, further comprising an unfilled microporous polyolefin film positioned surface-to-surface with the inorganic material-filled microporous polymer film to form a multilayer separator assembly with high temperature dimensional stability and thermal shutdown characteristics.

15. The energy storage device of claim 8 that is a lithium battery.

16. A battery pack, comprising:
multiple electrically connected secondary cells each of which having multiple electrodes contained in a package filled with electrolyte and separated by a heat resistant microporous polymer film exhibiting freestanding characteristics;
the polymer film having first and opposite second surfaces and including a polymer matrix binding inorganic filler material, the polymer matrix characterized by a melting point temperature and formed of polymer fibrils;
the polymer matrix including an ultrahigh molecular weight polyethylene that provides sufficient molecular chain entanglement to form three-dimensional interconnecting and interpenetrating pore and polymer networks through which the bound inorganic filler material is generally uniformly dispersed from the first surface to the second surface; characterized by
the microporous polymer film being a microporous polymer film annealed at a temperature above the melting point temperature of the polymer matrix;
the interconnecting and interpenetrating pore network having pores encompassing a volume fraction of greater than 60%; and
the inorganic filler material present at a loading level of greater than about 53 wt. % in the annealed microporous polymer film to achieve by coalescence of the polymer fibrils a lower thermal shrinkage than that achievable before the annealing of the polymer matrix and retention of porosity of the microporous polymer film at temperatures exceeding the melting point temperature of the polymer matrix.

17. The battery pack of claim 16, in which the three-dimensional interconnecting and interpenetrating pore network formed in the microporous polymer film of each of the multiple electrically connected secondary cells contributes to an electrical resistance represented by a MacMullin number, $N_{Mac}$, of less than 4.5.

18. An electric motor vehicle power train, comprising:
a battery pack providing direct current power to an inverter to produce alternating current power, the battery pack including multiple electrically connected secondary cells, each of the multiple secondary cells having multiple electrodes contained in a package filled with electrolyte and separated by a heat resistant microporous polymer film exhibiting freestanding characteristics;
the polymer film having first and opposite second surfaces and including a polymer matrix binding inorganic filler material, the polymer matrix characterized by a melting point temperature and formed of polymer fibrils;
the polymer matrix including an ultrahigh molecular weight polyethylene that provides sufficient molecular chain entanglement to form three-dimensional interconnecting and interpenetrating pore and polymer networks through which the bound inorganic filler material is generally uniformly dispersed from the first surface to the second surface; characterized by
the microporous polymer film being a microporous polymer film annealed at a temperature above the melting point temperature of the polymer matrix;
the interconnecting and interpenetrating pore network having pores encompassing a volume fraction of greater than 60%; and
the inorganic filler material present at a loading level of greater than about 53 wt. % in the annealed microporous polymer film to achieve by coalescence of the polymer fibrils a lower thermal shrinkage than that achievable before the annealing of the polymer matrix and retention of porosity of the microporous polymer film at temperatures exceeding the melting point temperature of the polymer matrix;
speed reduction gears operatively connected to a set of vehicle wheels; and
an electric motor operatively connected to the speed reduction gears and responding to the alternating current power produced by the inverter to impart motive force to the speed reduction gears and thereby turn the set of vehicle wheels.

\* \* \* \* \*